United States Patent
Arimilli et al.

[11] Patent Number: 6,061,762
[45] Date of Patent: May 9, 2000

[54] APPARATUS AND METHOD FOR SEPARATELY LAYERING CACHE AND ARCHITECTURAL SPECIFIC FUNCTIONS IN DIFFERENT OPERATIONAL CONTROLLERS

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/839,442

[22] Filed: Apr. 14, 1997

[51] Int. Cl.[7] .............................. G06F 12/00; G06F 13/00
[52] U.S. Cl. .......................... 711/118; 711/146; 711/154
[58] Field of Search ................................ 711/3, 118, 129, 711/130, 146, 153, 154; 395/800.01; 712/1

[56] References Cited

U.S. PATENT DOCUMENTS

| 4,575,792 | 3/1986 | Keeley | 395/183.18 |
|---|---|---|---|
| 5,025,366 | 6/1991 | Barror | 711/128 |
| 5,136,691 | 8/1992 | Barror | 711/139 |
| 5,418,916 | 5/1995 | Hall et al. | 395/569 |
| 5,584,013 | 12/1996 | Cheong et al. | 711/122 |
| 5,668,972 | 9/1997 | Liu et al. | 711/136 |
| 5,732,408 | 3/1998 | Takahashi | 711/113 |
| 5,745,058 | 4/1998 | Auerbach et al. | 341/51 |
| 5,751,983 | 5/1998 | Abramson et al. | 395/392 |

FOREIGN PATENT DOCUMENTS

| 0 176 972 A2 | 4/1986 | European Pat. Off. . |
|---|---|---|
| 0 258 559 A2 | 3/1988 | European Pat. Off. . |
| 0 080 875 A2 | 6/1993 | European Pat. Off. . |
| 2 107 092 | 4/1983 | United Kingdom . |
| 2 256 512 | 12/1992 | United Kingdom . |
| 2 302 190 | 11/1995 | United Kingdom . |
| WO 87/04823 A1 | 8/1987 | WIPO . |

*Primary Examiner*—Tuan V. Thai
*Attorney, Agent, or Firm*—Mark E. McBurney; Daniel E. Venglarik; Andrew J. Dillon

[57] ABSTRACT

Cache and architectural specific functions are layered within a controller, simplifying design requirements. Faster performance may be achieved and individual segments of the overall design may be individually tested and formally verified. Transition between memory consistency models is also facilitated. Different segments of the overall design may be implemented in distinct integrated circuits, allowing less expensive processes to be employed where suitable.

14 Claims, 3 Drawing Sheets

APPARATUS AND METHOD FOR SEPARATELY LAYERING CACHE AND ARCHITECTURAL SPECIFIC FUNCTIONS IN DIFFERENT OPERATIONAL CONTROLLERS

RELATED APPLICATIONS

The present invention is related to the subject matter of the following commonly assigned copending United States patent applications, each filed Apr. 14, 1997: Ser. No. 08/834,115, now pending, (Docket No. AT9-97-293) entitled "Method of Layering Cache and Architectural Specific Functions to Expedite Multiple Designs"; Ser. No. 08/834,114, now pending, (Docket No. AT9-97-294) entitled "Method of Layering Cache and Architectural Specific Functions for Splitting Operations"; Ser. No. 08/839,445, now pending, (Docket No. AT9-97-193) entitled "Method of Layering Cache and Architectural Specific Functions to Permit Generic Interface Definition"; Ser. No. 08/839,443, now pending, (Docket No. AT9-97-194) entitled "Method of Layering Cache and Architectural Specific Functions to Permit Facilitate Design Extension"; and Ser. No. 08/839,441, now pending, (Docket No. AT9-97-195) entitled "Method of Layering Cache and Architectural Specific Functions to Promote Operation Symmetry." The content of the above-mentioned copending applications is incorporated herein by reference.

BACKGROUND OF THE INVENTION

1. Technical Field

The present invention relates in general to cache controllers in data processing systems and in particular to cache controllers which layer cache and architectural specific functions. Still more particularly, the present invention relates to layering cache and architectural specific functions within a controller to improve performance and simplify design.

2. Description of the Related Art

Data processing systems which utilize a level two (L2) cache typically include a cache controller for managing transactions affecting the cache. Such cache controllers are conventionally implemented on a functional level, as depicted in FIG. 3. For example, a cache controller 302 may include logic 304 for maintaining the cache directory, logic 306 for implementing a least recently used (LRU) replacement policy, logic for managing reload buffers 308, and logic for managing store-back buffers 310. In traditional implementations, the cache is generally very visible to these and other architectural functions typically required for cache controllers, with the result that cache controller designs are specific to a particular processors such as the PowerPC™, Alpha™, or the x86 family of processors.

The prior art approach imposes stringent and complex design requirements on the controller implementation. The maximum frequency obtainable is limited by the interlocks required. Testing and formal verification of the design may be frustrated by the complexity of the design. It would be desirable, therefore, to simplify the design of a cache controller to eliminate such complexities.

SUMMARY OF THE INVENTION

It is therefore one object of the present invention to provide an improved cache controller for a data processing system.

It is another object of the present invention to provide an improved cache controller having layered cache and architectural specific functions.

It is yet another object of the present invention to layer cache and architectural specific functions within a controller to improve performance and simplify design.

The foregoing objects are achieved as is now described. Cache and architectural specific functions are layered within a controller, simplifying design requirements. Faster performance may be achieved and individual segments of the overall design may be individually tested and formally verified. Transition between memory consistency models is also facilitated. Different segments of the overall design may be implemented in distinct integrated circuits, allowing less expensive processes to be employed where suitable.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
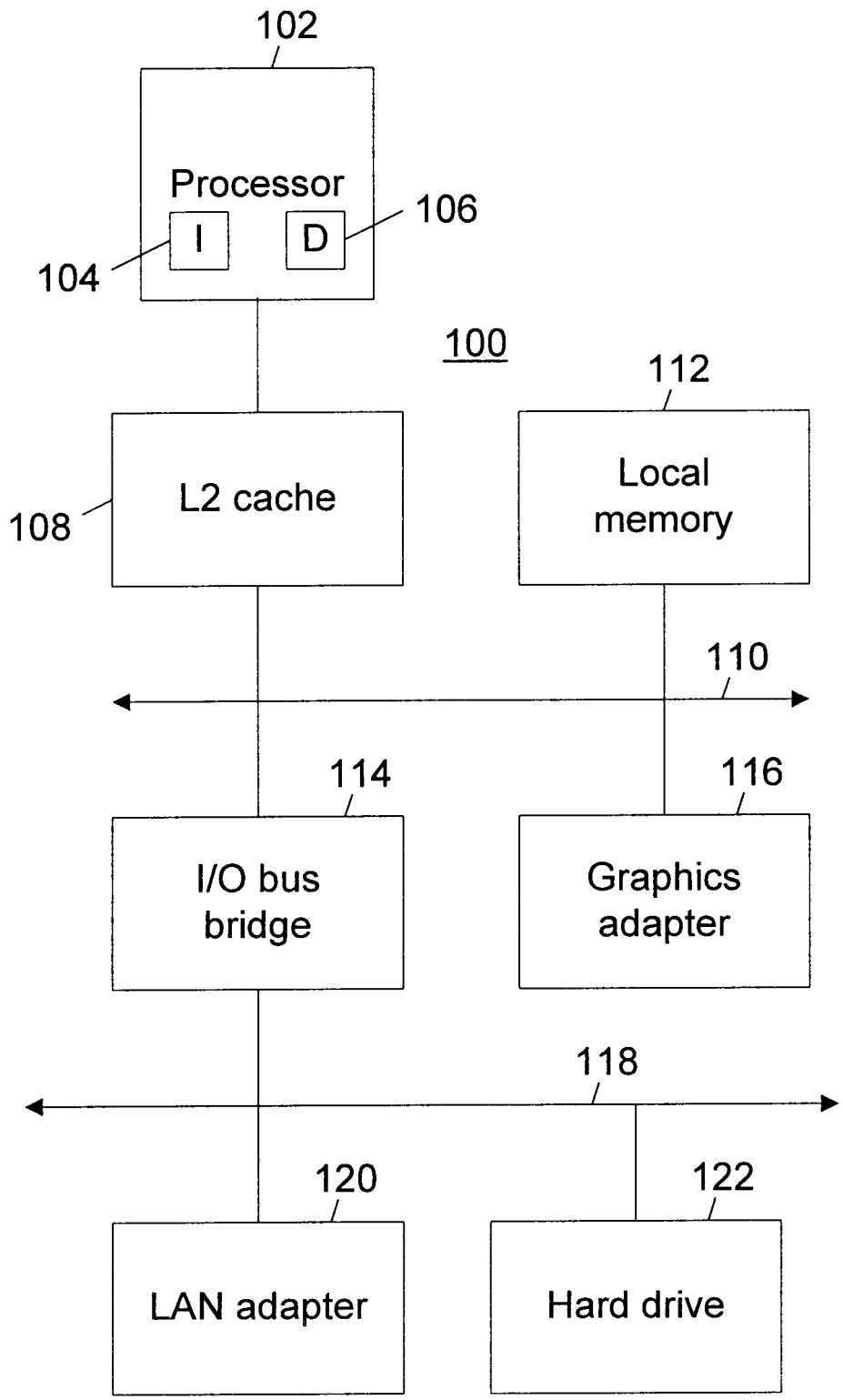
FIG. 1 depicts a data processing system implemented with a nonshared cache controller design in accordance with a preferred embodiment of the present invention.

With reference now to the figures, and in particular with reference to FIG. 1, a data processing system implemented with a nonshared cache controller design in accordance with a preferred embodiment of the present invention is depicted. Data processing system 100 may include only a single processor or may be a symmetric multiprocessor (SMP) system including a plurality of processors. A single processor system is shown in the example depicted. Processor 102 may be a superscalar reduced instruction set computing (RISC) processor including separate level one instruction and data caches 104 and 106 within the processor. A PowerPC™ processor may be utilized for processor 102.

Processor 102 is connected to a level two (L2) cache 108, which is a nonshared cache. A second processor (not shown) may be added to the system depicted, either with a separate L2 cache or sharing L2 cache 108 with processor 102. L2 cache 108 is connected to system bus 110 for data processing system 100. Local memory 112 is also connected to system bus 110, as is I/O bus bridge 114. Other devices, such as memory-mapped graphics adapter 116, may also be connected to system bus 110. I/O bus bridge 114 is connected to I/O bus 118, which may be connected to a variety of other devices such as local area network (LAN) adapter 120 and hard disk drive 122.

Those of ordinary skill in the art will appreciate that the hardware depicted in FIG. 1 may vary. For example, other peripheral devices, such as optical disk drive and the like also may be used in addition or in place of the hardware depicted. The depicted example is not meant to imply architectural imitations with respect to the present invention. In particular, a data processing system need not be limited to a single processor as shown in the depicted example to benefit from the present invention. The present invention may be employed, for example, to improve the performance of a data processing system having two processors, each with a corresponding L2 cache.

Figure 2:
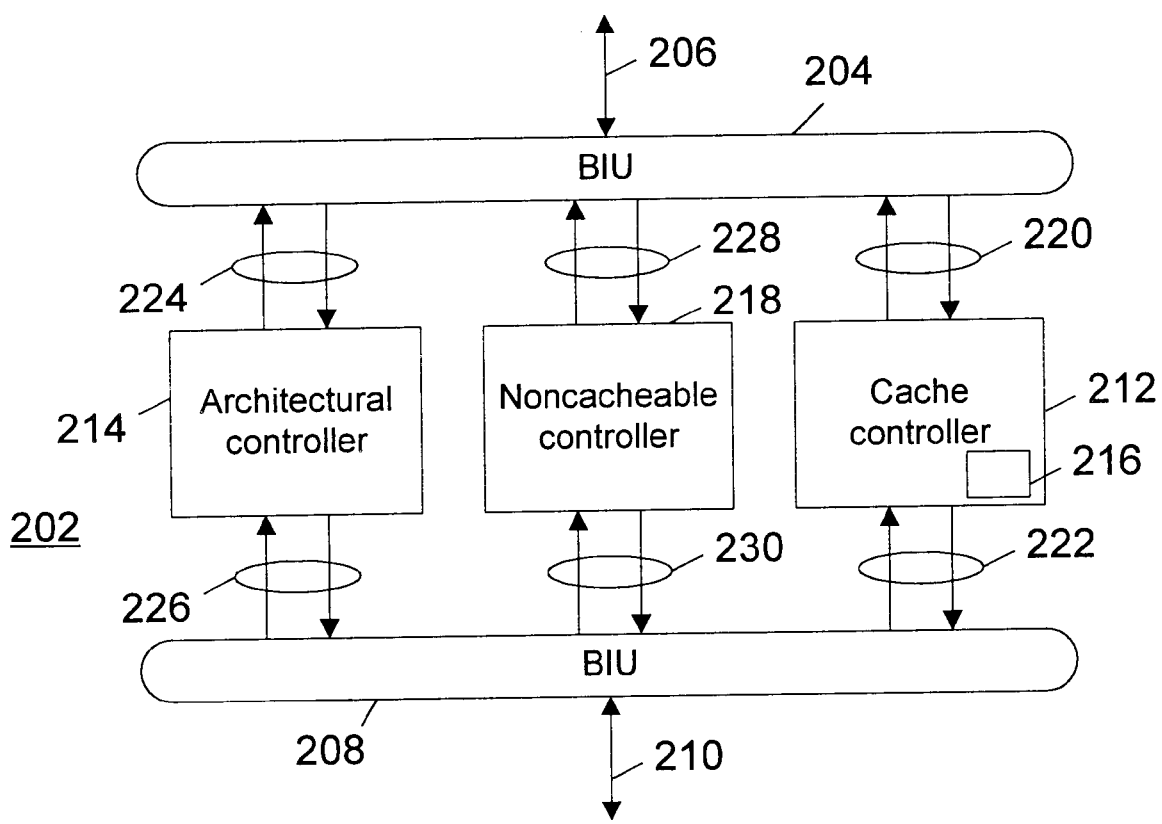
FIG. 2 is a block diagram of a nonshared cache controller design in accordance with a preferred embodiment of the present invention.
Figure 3:
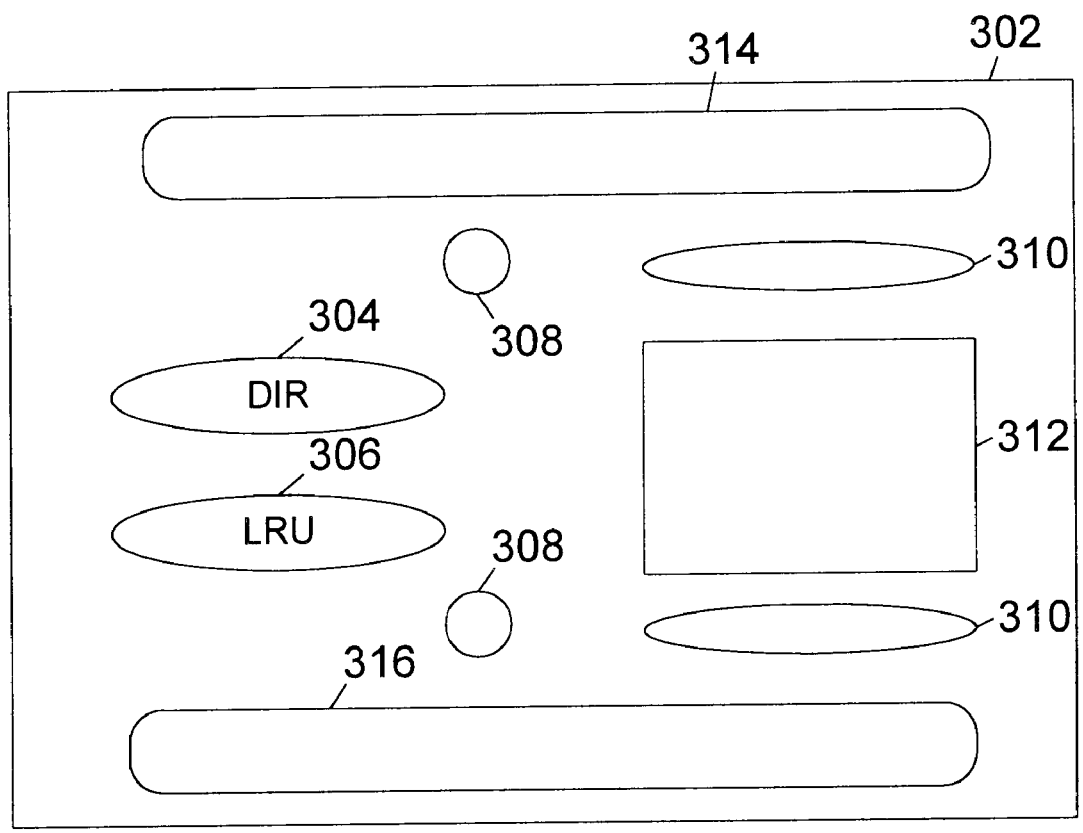
FIG. 3 depicts a prior art cache controller design.

Referring to FIG. 2, a block diagram of a nonshared cache controller design in accordance with a preferred embodiment of the present invention is illustrated. Controller 202 is implemented within cache 108 depicted in FIG. 1. Controller 202 includes a bus interface unit (BIU) 204 connected to an upper bus 206 for a processor or a higher level cache, and a bus interface unit 208 to a lower bus 210, which may be a system bus or a bus to another cache. Upper bus 206 and lower bus 210 may differ; upper bus 206 may be, for example, a 60X bus, while lower bus 210 may be a different bus.

Cache and architectural specific functions within controller 202 are layered. Thus, controller 202 includes cache controller 212 and architectural controller 214. Operations are distinguished as "cache" or "architectural" operations. Only cache operations are handled by cache controller 212, and only cache controller 212 performs operations on cache 216. Architectural operations are handled by architectural controller 214 and are seen by cache controller 212 as system-side operations.

A third unit, noncacheable controller 218, is also contained within cache controller 202. Noncacheable controller 218 is actually a counterpart to cache controller 212 in that it also handles only cache operations. Whereas cache controller 212 handles cache operations directed at cache memory locations, noncacheable controller 218 handles cache operations directed at memory locations which do not map to cache 216. It is advantageous, for reasons known to those skilled in the art, to treat part of the system memory as noncacheable. Such memory may be utilized, for example, by memory mapped devices. While cache controller 212 operates on full cache blocks, noncacheable controller 218 operates on smaller memory segments, typically less than 8–16 bytes. Moreover, noncacheable controller 218 does not store data, while cache controller 212 retains copies of data handled within cache 216.

Cache operations are typically those operations which read or write values to memory locations, and therefore may change or retrieve the value of data in a memory location. Cache operations are generally those simple operations which result from LOAD or STORE instructions, or equivalent instructions, within a processor. The remaining operations are defined as architectural operations. Unlike cache operations, architectural operations are more complicated and generally do not change the value of data in a memory location. An architectural operation may move the data to a different location within the cache hierarchy, change the status of data in a particular memory location, or perform other such functions. However, architectural operations generally do not directly alter the value of data within a memory location. An example of an exception is the data cache block zero (DCBZ) instruction in the PowerPC™ architecture, which is an architectural operation which alters the values of data in a memory location on a cache block basis.

Cache operations, supported by cache controller 212, comprise the largest majority of operations affecting the system cache. Within the complete set of operations supported by a given processor, cache operations may not derive from the portion of the instruction set which is most frequently executed and/or consume the largest majority of processor cycles. However, disregarding instructions directed to other functional units within the processor, such as the floating point, fixed point, or branch units, cache operations are, collectively, executed most often and utilize the largest measure of time.

The remaining operations affecting a system cache—those employed for cache management, operating system management, page management, and synchronization, etc.—are layered out and supported by architectural controller 214. Virtually all processor architectures support such operations, which are utilized in real time operation much less frequently than cache operations. Additionally, individual operations among the architectural operations are generally implemented, if at all, in substantially divergent manners for different processors of interest.

Different designs may vary the set of operations supported by the cache controller and, by default, the remaining operations layered for support by the architectural controller. However, increasing the number of operations supported by the cache controller increases the complexity of logic required. Additionally, if instructions selected for support by the cache controller are not supported by all processors of interest, the cache controller design loses its direct transferability to new controller designs.

While certain operations pass down only one path within controller 202—that is, through architectural controller 214 or cache controller 212—other operations are split and pass down both paths. Cache controller 212 employs a pass-through design, in which operations initiated at interface 220 generate a response at interface 222 while operations initiated at interface 222 produce a responsive action at interface 220.

Because cache and architectural operations are layered within controller 202, bus transactions and protocols may also be layered. That is, generic interfaces may be defined for cache controller 212, architectural controller 214, and noncacheable controller 218. Thus, interfaces 220–230 comprise generic protocol interfaces to bus interface units 204 and 208 which are, to the extent possible, not architecturally specific. This decouples the design for cache controller 212 from the specific protocols of bus 206 and bus 210, allowing the design for cache controller 212 to be reused. Bus interface units 204 and 208 are responsible for managing transactions and protocols to bus 206 and system bus 210, translating the specific bus transactions into the protocol for generic interfaces 220–230. By employing generic interfaces for interfaces 220–230, the designs for controllers 212, 214, and 218 are isolated from specific bus architectures and may be readily duplicated.

In contrast to traditional cache controllers, cache controller 212 may thus be implemented in a manner independent of the two buses 206 and 210, responding only to cache operations. Although such cache operations are initiated by transactions on either bus 206 or bus 210, only certain bus transactions will prompt a response within cache controller 212. In a preferred embodiment, cache controller 212 only responds to instruction fetch operations (IFETCH), LOAD operations, and WRITE operations on bus 206, and to READ operations, WRITE operations, and traditional SNOOPS on bus 210. This results in substantially simplified design requirements for cache controller 212. This is accomplished by avoiding the usual practice of overlaying the highly irregular (semantically and temporally) architectural operations and cache operations. The burden of responding to the architectural operations is removed from the design of cache controller 212 and placed in architectural controller 214.

The cache operations handled by cache controller 212 are supported by every commercial processor of interest in substantially the same form. Only minor differences in specific implementation, from which cache controller 212 in the present invention is decoupled by generic interfaces 220 and 222, distinguish comparable instructions for different processors of interest.

By layering selected cache and architectural functions, and implementing generic interfaces to bus interface units 204 and 208, a large portion of the overall design of controller 202 may be directly transferred to new implementations. The cache controller logic may be reused without significant modification for cache operations. New sleeves of logic for the bus interface units may be easily implemented for handling new bus protocols and converting the generic protocol interfaces 220–230 of cache, architectural, and noncacheable controllers 212, 214, and 218 to interfaces for bus 206 and bus 210. The most significant effort for implementing a design supporting a different processor is required by the architectural controller. Individual design of the logic supporting the architectural operations is required in any case since processor architectures vary dramatically. Overall, however, a significant savings in design effort for different processors may be achieved since only the semantics of operations handled by architectural controller 214 will change.

By layering cache and architectural functions, limiting cache controller 212 to responding to a few fundamental operations, the cache controller logic is greatly streamlined and simplified. In addition, the architectural controller logic is also simplified since, by separating the two classes of operations, issues of interrelationships between operations in different classes are eliminated. The cache and architectural controllers may be designed as individual units.

Layering cache and architectural functions allows those operations which are performed most frequently—cache operations—to be executed as fast as possible. The remaining architectural operations, which may occur as infrequently as once every 20,000 operations, are layered out handled in the existing (and necessary) snoop logic for controller 202.

Layering cache and architectural functions also provides benefits in designing cache controller 212. In addition to being able to concentrate design efforts on simply running a few instructions as fast as possible, the design for cache controller 212 may be separately completed and tested. The complex logic required for architectural controller 214 need not impede completion of the cache controller design, which may be tested utilizing the generic interfaces.

Formal verification attempts to mathematically prove the operation of a design. Such formal verification is virtually impossible with extremely large, complicated designs. The modular approach of the present invention permits independent formal verification of different units within the overall design.

Independent verification of the cache controller design is important since cache controller 212 still contains the LRU logic and other essential logic discussed earlier. Additionally, bugs are more difficult to locate when contained within the mainstream path of the design if the mainstream path is complicated. By layering the more complex logic required for architectural controller 214 and the logic required for cache controller 212, the bugs become easier to locate. Moreover, with the layered design, bugs within the architectural controller 214 are less likely to impact operation of cache controller 212, which may continue to operate normally.

Because the complex, dedicated logic required for architectural operations is segregated, cache controller 212 may be pipelined and may operate at processor frequency while architectural controller 214 is run at a much lower frequency. In fact, the architectural controller 214 may be implemented in a separate chip or on a separate die, using a less expensive process.

Since the operations handled by architectural controller 214 occur so infrequently, an overall performance increase in controller 202 may actually be realized. The design allows instructions which are executed most frequently to be performed as fast as possible by streamlining cache controller 212 to only the essential logic.

Providing dedicated hardware for architectural operations directly in the mainstream path of the controller enormously increases the complexity of the logic required and impacts pipelining and frequency within the core controller logic. Nonetheless, traditional designs include the slow, scalar, nonpipelined logic required to support architectural instructions within the mainstream path, slowing the entire cache controller.

Layering cache and architectural allows pipelining of cache operations, and simplifies design requirements by eliminating the need for interlocks. Simplifying the design directly impacts the clock frequency (MHz) which may be obtained, since more complicated logic requires more interlocks, increasing cycle time.

Layering allows the design to be implemented in simple, largely autonomous units. Layering also allows cache controller designs to be more resilient to changing from one memory consistency model to another. The controller design may be developed more expeditiously during migration—from one memory consistency model to another, one processor to another, or both—by altering the cache and architectural controllers separately.

While the invention has been particularly shown and described with reference to a preferred embodiment, it will be understood by those skilled in the art that various changes in form and detail may be made therein without departing from the spirit and scope of the invention.

What is claimed is:

1. A method of layering operations in a controller, comprising:

receiving operations from a bus at a bus interface unit for a storage device within a storage hierarchy;

performing each cache operation to be performed on data within the storage device and received at the bus interface unit for the storage device in a first controller unit; and performing at least a portion of each architectural operation to be performed on metadata for data within the storage device and received at the bus interface unit for the storage device in a second controller unit;

wherein the step of performing cache operation received at the bus interface unit for the storage device in the first controller unit further comprises performing instruction fetch, load, write, read and snoop operations in the first controller unit;

wherein the step of performing at least a portion of each architectural operation received at the bus interface unit for the storage unit in the second controller unit further comprises performing cache management, memory management, operating system manangement, and synchronization operations in the second controller unit.

2. The method of claim 1, wherein the step of receiving operations from a bus at a bus interface unit for a storage device within a storage hierarchy further comprises:

receiving operations from a processor.

3. The method of claim 1, wherein the step of receiving operations from a bus at a bus interface unit for a storage device within a storage hierarchy further comprises:

receiving operations from a system bus.

4. The method of claim 1, wherein the step of receiving operations from a bus at a bus interface unit for a storage device within a storage hierarchy further comprises:

receiving operations from a processor at a first bus interface unit for the storage device; and receiving operations from a system bus at a second bus interface unit for the storage device.

5. The method of claim 1, wherein the step of performing at least a portion of each architectural operation received at the bus interface unit for the storage device in a second controller unit further comprises:

performing a first portion of an architectural operation in the first controller unit, wherein the first portion of the architectural operation corresponds to a cache operation; and performing a second portion of the architectural operation in the second controller unit.

6. A controller, comprising:

a bus interface unit receiving operations from a bus for a storage device within a storage hierarchy;

a first controller unit within the storage device performing each cache operation to be performed on data within the storage device and received at the bus interface unit for the storage device; and a second controller unit within the storage device performing at least a portion of each architectural operation to be performed on metadata for data within the storage device and received at the bus interface unit for the storage device;

wherein the first controller unit performs instruction fetch, load, write, read and snoop operations;

wherein the second controller unit performs cache management, memory management, operating system management, and synchronization operations.

7. The controller of claim 6, wherein the bus interface unit receives operations from a processor.

8. The controller of claim 6, wherein the bus interface unit receives operations from a system bus.

9. The controller of claim 6, wherein the bus interface unit comprises a first bus interface unit receiving operations from a processor for the storage device, the controller further comprising:

a second bus interface unit receiving operations from a system bus for the storage device.

10. The controller of claim 6, wherein:

the first controller unit performs portions of architectural operations which correspond to a cache operation; and the second controller unit performs remaining portions of architectural operations.

11. A method of layering operations in a storage device within a data processing system storage hierarchy, comprising:

receiving operations from a processor at a first bus interface unit for the storage device;

receiving operations from a system bus at a second bus interface unit for the storage device;

performing each cache operation to be performed on data within the storage device and received at the first and second bus interface units in a first controller unit within the storage device; and performing at least a portion of each architectural operation to be performed on metatdata for data within the storage device and received at the first and second bus interface units in a second controller unit within the storage device;

wherein the step of performing each cache operation received at the first and second bus interface units in the first controller unit within the storage device further comprises performing portions of architectural operations corresponding to cache operations in the first controller unit;

wherein the step of performing at a portion of each architectural operation received at the first and second bus interface units in the second controller unit within the storage device further comprises performing cache management, memory management, operating system management, and synchronization operations in the second controller unit.

12. The method of claim 11, wherein the step of performing each cache operation received at the first and second bus interface units in a first controller unit within the storage device further comprises:

performing instruction fetch, load, store, write, read and snoop operations in the first controller unit.

13. The method of claim 11, wherein the step of performing at least a portion of each architectural operation received at the first and second bus interface units in a second controller unit within the storage device further comprises:

performing a remaining portion of architectural operations having portions corresponding to cache operations in the second controller unit.

14. The method of claim 11, further comprising:

performing each cache operation on noncacheable memory addresses received at the first and second bus interface units in a third controller unit within the storage device.

* * * * *